W. W. VILLENAUVE AND R. C. FISCHER.
POTATO PEELER.
APPLICATION FILED DEC. 19, 1921.

1,436,124.

Patented Nov. 21, 1922.
2 SHEETS—SHEET 1.

Inventors.
Walter W. Villenauve.
Raymond C. Fischer.
By Harry C. Schroeder
Attorney W. W. VILLENAUVE AND R. C. FISCHER.
POTATO PEELER.
APPLICATION FILED DEC. 19, 1921.

1,436,124.

Patented Nov. 21, 1922.
2 SHEETS—SHEET 2.

Inventor
Walter W. Villenauve.
Raymond C. Fischer.

By Harry C. Schroeder
Attorney

Patented Nov. 21, 1922.

1,436,124

UNITED STATES PATENT OFFICE.

WALTER W. VILLENAUVE AND RAYMOND C. FISCHER, OF OAKLAND, CALIFORNIA.

POTATO PEELER.

Application filed December 19, 1921. Serial No. 523,331.

*To all whom it may concern:*

Be it known that we, WALTER W. VILLENAUVE and RAYMOND C. FISCHER, citizens of the United States, residing at Oakland, in the county of Alameda and State of California, have invented certain new and useful Improvements in Potato Peelers, of which the following is a specification.

Our invention is an improved potato peeler which is simple in construction and highly efficient in operation.

Referring to the annexed drawing in which our invention is illustrated and which forms a part of this specification:

Figure 1:
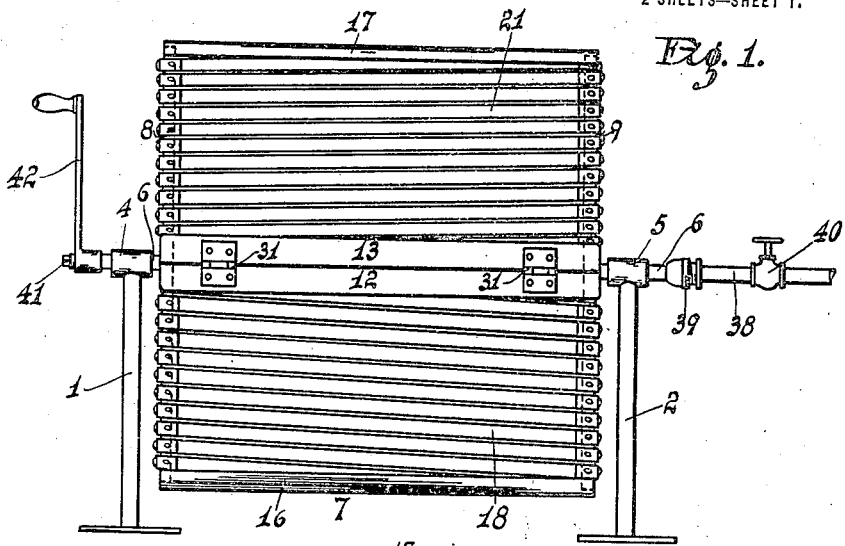
Figure 1 is a side elevation of our potato peeler.
Figure 2:
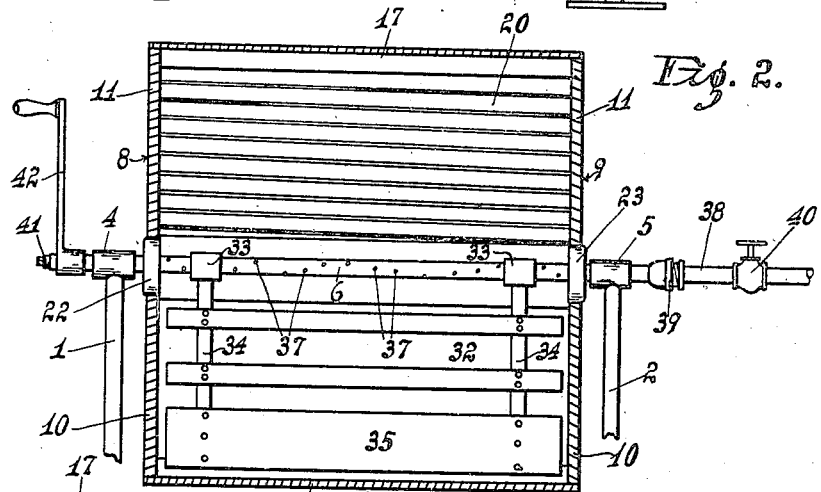
Figure 2 is a vertical longitudinal section of our potato peeler.

In the drawing 1 and 2 indicate standards on the upper ends of which are bearings 4 and 5 in which is journaled a tubular shaft 6, on which shaft is secured a drum 7. The drum 7 comprises heads 8 and 9, each being formed in two semi-circular sections 10 and 11; bars 12 and 13 connecting the sections 10—10 and 11—11 respectively at their meeting point at one side; bars 14 and 15 connecting the sections 10—10 and 11—11 respectively at their meeting point at their other side; bars 16 and 17 respectively connecting the head sections 10—10 between the bars 12 and 14 and the head sections 11—11 between the bars 13 and 15; knives 18 connected at their ends to the periphery of the head sections 10—10 between the bars 12 and 16; knives 19 connected at their ends to the periphery of the head sections 10—10 between the bars 16 and 14; knives 20 connected at their ends to the head sections 11—11 between the bars 15 and 17; knives 21 connected at their ends to the head sections 11—11 between the bars 17 and 13; and collars 22 and 23 located in the center of the heads 8 and 9 respectively and fixed in the head sections 10—10, which collars are secured on shaft 6. The ends of the knives 18, 19, 20 and 21 are secured to the outside of one arm of angle brackets 25, the other arm of which brackets at the respective ends of the knives engage the outside of the heads 8 and 9 and are provided with longitudinal slots 26 to receive screws 27 which are driven into said heads, whereby said knives are adjustably secured to said heads so that they may be adjusted inwardly or outwardly with relation to the drum and secured in adjusted position. Each group of knives 18, 19, 20 and 21 is inclined transversely and inwardly with relation to the drum and have inner cutting edges 30. Each group of knives is also inclined longitudinally and in an opposite direction to each adjacent group. The upper half of the drum 7 is hinged to the lower half by hinges 31 secured to the outside of bars 12 and 13. A grating 32 is suspended vertically on the shaft 6 within the drum by means of knuckles 33 surrounding said shaft and in which the shaft turns; said knuckles being secured to the upper ends of the vertical members 34 of the grating. The lowermost horizontal member 35 of said grating rests in the lower part of the drum and is weighted to maintain the grating suspended in a vertical position. A lock 36 is mounted on the outside of the bars 14 and 15 for locking the upper and lower halves of the drum together in closed position. The shaft 6 is provided with perforations 37 within the drum. A water pipe 38 is connected to one end of the hollow shaft 6 by a swivel coupling 39, a valve 40 in the pipe 38 controlling the admission of water into the shaft 6. The other end of the shaft 6 is closed by a screw plug 41. A crank 42 is secured on the plugged end of the shaft 6 whereby the drum is rotated.

Figures 3, 4:
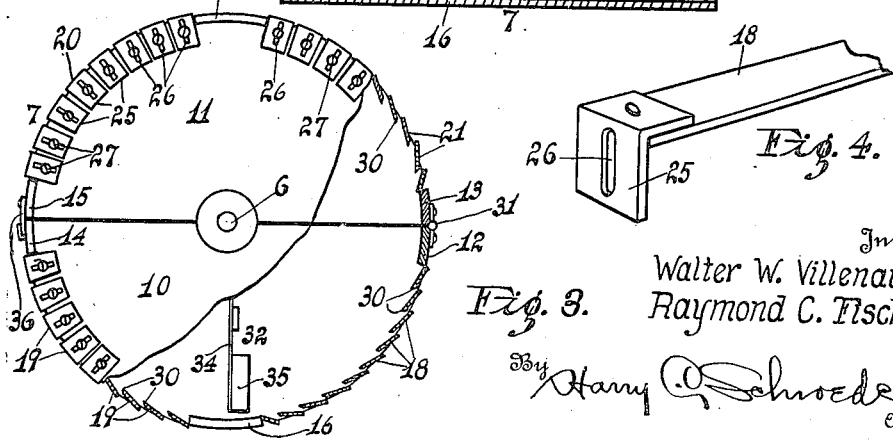
Figure 3 is an elevation partly broken away to show the relation of the peeling blades.
Figure 4 is a perspective view of one end of one of the peeling blades.

The upper half of the drum is unlocked and swung back upon its hinges in order to place the potatoes in the drum. When the potatoes have been placed in the drum the upper half of the drum is swung closed and the two halves of the drum are locked together by lock 36. The drum is then rotated clockwise (Fig. 3) and the potatoes are agitated and brought against the right side of the grating and held thereby in the lower right quadrant of the drum, while the knife edges 30, engaging the potatoes peel them. The knives 21 are arranged with their cutting edges 30 slightly overlapping inwardly the opposite edges of the adjacent knives leaving a narrow space between said edges. Water is sprinkled on the potatoes from the shaft 6 through the perforations 37 which softens the potatoes so that the knives may peel them easily.

Figure 5:
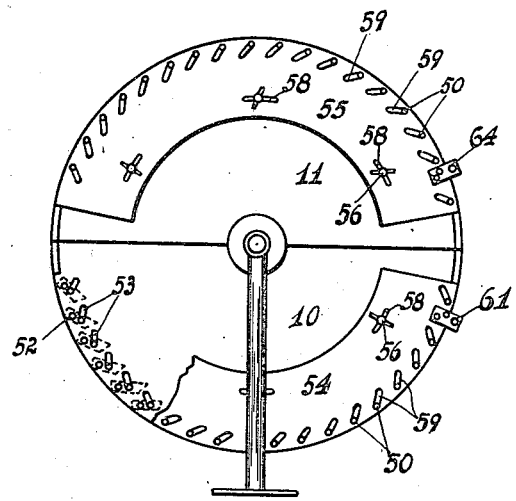
Figure 5 is an end view partly broken away of a modified form of our invention.
Figure 6:
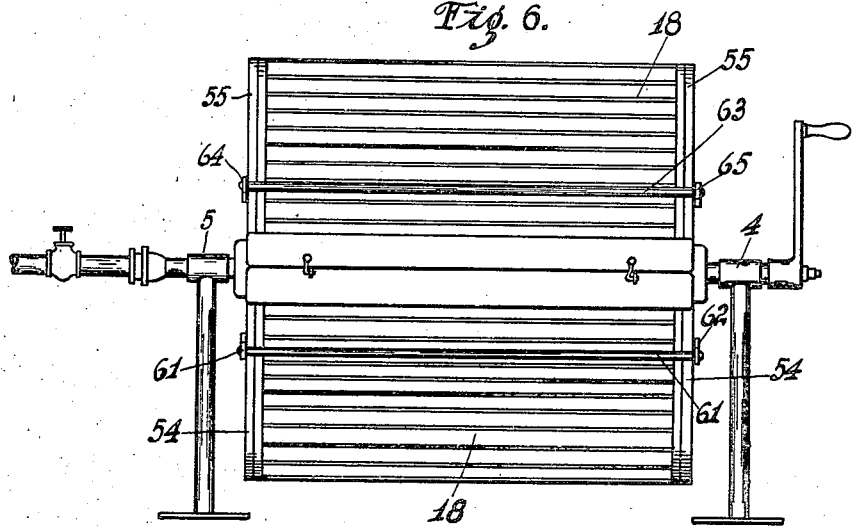
Figure 6 is a side view of said modified form.
Figure 7:
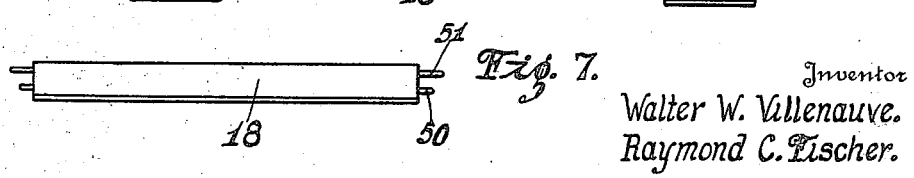
Figure 7 is a side view of one of the blades used in said modified form.

In the form of our invention shown in Figures 5 to 7 inclusive, the angle brackets 25 are eliminated and pins 50 and 51 project from each end of the blades 18 which pins project through holes 52 and slots 53 in the heads 8 and 9 of the drum. On each end of the drum are adjustably mounted a pair of arcuate plates 54 and 55 against the head sections 10 and 11 respectively by means of set screws 56, said screws extending through slots 58 in said plates which slots are concentric to the center of the drum. Angular slots 59 are provided in the plates 54 and 55 through which extend the pins 51. A rod 60 is secured at its ends to brackets 61 and 62 which are secured to the plates 54—54 whereby both plates are caused to turn together on the studs 56. A rod 63 is secured at its ends to brackets 64 and 65 which are secured to the plates 55—55. Upon turning the plates 54 and 55 the slots 59 engaging the pins causes the blades 18 to turn on their pivots 50 whereby the angle of the blades and their cutting effectiveness are adjusted. The plates 54 and 55 and the blades 18 are secured in any desired position by tightening the nuts 57.

Having described our invention, we claim:

1. A potato peeler including a rotary drum comprising a plurality of knives secured at their ends to the periphery of the drum heads with their cutting edges extending inwardly within the drum, said knives being inclined longitudinally with relation to the axis of the drum.

2. A potato peeler including a rotary drum comprising a plurality of groups of knives secured at their ends to the periphery of the drum heads, with their cutting edges extending inwardly within the drum, each group of knives being inclined longitudinally with relation to the axis of the drum and in a direction opposite to the direction in which the adjacent groups of knives are inclined.

3. In a potato peeler, a rotary shaft suitably mounted, a drum secured on said shaft, peeling knives secured at their ends to the periphery of the drum heads with their cutting edges extending inwardly, and a grating suspended from said shaft within the lower part of the drum.

4. In a potato peeler, a rotary drum comprising heads, a plurality of knives extending longitudinally of the drum over the periphery of the heads thereof, angle irons to one arm of which the ends of said knives are secured, the other arm of said angle irons engaging the outside of said drum heads and provided with slots to receive screws driven into said head.

5. A potato peeler including a rotary drum, the heads of said drum being provided with a plurality of holes and a plurality of angular slots, a plurality of blades, a pair of pins on each end of said blades, one of said pins on each end of said blades extending through one of said holes in one of the drum heads, the other pin on each end of said blades extending through one of said slots in one of said drum heads, a plate mounted on each end of the drum to turn concentrically to the drum, each of said plates being provided with angular slots through which extend said other pins on the ends of said blades, and means for securing said plates to the head in different positions to adjust the angle of said blades.

6. A potato peeler including a rotary drum, the heads of said drum being provided with a plurality of holes and a plurality of angular slots, a plurality of blades, a pair of pins on each end of said blades, one of said pins on each end of said blades extending through one of said holes in one of the drum heads, the other pin on each end of said blades extending through one of said slots in one of said drum heads, a plate mounted on each end of the drum to turn concentrically to the drum, each of said plates being provided with angular slots through which extend said other pins on the ends of said blades, means for securing said plates to the head in different positions to adjust the angle of said blades, and means connecting said plates so that they may be turned together.

7. In a potato peeler, a hollow rotatable shaft suitably mounted, perforations in said shaft, drum heads secured to said shaft, blades adjustably secured to said heads, and a weighted grating suspended from said shaft.

In testimony whereof we affix our signatures.

WALTER W. VILLENAUVE.
RAYMOND C. FISCHER.